US011584378B2

(12) United States Patent
Croxford (10) Patent No.: US 11,584,378 B2
(45) Date of Patent: Feb. 21, 2023

(54) VEHICLE-ASSIST SYSTEM (71) Applicant: Arm Limited, Cambridge (GB)

(72) Inventor: Daren Croxford, Swaffham Prior (GB)

(73) Assignee: Arm Limited, Cambridge (GB)

( * ) Notice: Subject to any disclaimer, the term of this patent is extended or adjusted under 35 U.S.C. 154(b) by 10 days.

(21) Appl. No.: 17/081,786

(22) Filed: Oct. 27, 2020

(65) Prior Publication Data
US 2022/0126837 A1 Apr. 28, 2022

(51) Int. Cl.
B60W 40/08 (2012.01)
B60W 50/16 (2020.01)
B60W 30/095 (2012.01)
B60W 40/02 (2006.01)
G06N 3/08 (2006.01)
B60W 50/14 (2020.01)

(52) U.S. Cl.
CPC ........ *B60W 40/08* (2013.01); *B60W 30/0956* (2013.01); *B60W 40/02* (2013.01); *B60W 50/16* (2013.01); *G06N 3/08* (2013.01); *B60W 2050/143* (2013.01); *B60W 2050/146* (2013.01); *B60W 2540/225* (2020.02); *B60W 2540/229* (2020.02); *B60W 2556/45* (2020.02)

(58) Field of Classification Search
CPC .. B60W 40/08; B60W 30/0956; B60W 40/02; B60W 50/16; B60W 2540/225; B60W 2556/45; B60W 2540/229; B60W 2050/143; B60W 2050/146; G06N 3/08
See application file for complete search history.

(56) References Cited

U.S. PATENT DOCUMENTS

| 2007/0089054 | A1* | 4/2007 | Morimoto | B60Q 9/00 715/700 |
| 2009/0167516 | A1* | 7/2009 | Kogawara | B60W 40/08 340/439 |
| 2011/0169625 | A1* | 7/2011 | James | G08G 1/165 340/439 |
| 2012/0212353 | A1* | 8/2012 | Fung | B60W 10/18 340/905 |
| 2012/0271484 | A1* | 10/2012 | Feit | B60W 10/18 701/1 |
| 2016/0117947 | A1* | 4/2016 | Misu | G09B 19/167 434/62 |
| 2016/0375900 | A1* | 12/2016 | Laur | B62D 15/0265 701/41 |
| 2018/0086339 | A1* | 3/2018 | Hanna | G06K 9/00604 |
| 2020/0379460 | A1* | 12/2020 | Stent | G06V 40/18 |
| 2022/0121867 | A1* | 4/2022 | Arar | B60W 50/14 |

* cited by examiner

Primary Examiner — Mohamed Barakat
(74) Attorney, Agent, or Firm — EIP US LLP (57) ABSTRACT A vehicle-assist system comprising one or more sensors to monitor an environment of a vehicle and an eye-tracking system, including an eye-tracking sensor, to determine a gaze characteristic of a driver of the vehicle. The vehicle-assist system is to detect a hazard, and determine a hazard location of the hazard, in the environment of the vehicle. Based on the hazard location and the gaze characteristic of the driver, the vehicle-assist system is to output an indication of the hazard to the driver.

18 Claims, 4 Drawing Sheets

VEHICLE-ASSIST SYSTEM

BACKGROUND OF THE INVENTION

Technical Field

The present disclosure relates to systems and methods for assisting a vehicle driver.

Description of the Related Technology

A vehicle-assist system, sometimes referred to as an "advanced driver-assistance system" (ADAS), is typically an electronic system that assists a driver of a vehicle, e.g. in driving and parking functions. An ADAS may use automated technology, such as sensors and cameras, to detect obstacles or driver errors, and respond accordingly. The overall purpose of an ADAS is to automate, adapt, and enhance vehicle systems for safety and improved driving.

SUMMARY

According to a first aspect of the present disclosure, there is provided a vehicle-assist system comprising:
  one or more sensors to monitor an environment of a vehicle;
  an eye-tracking system, including an eye-tracking sensor, to determine a gaze characteristic of a driver of the vehicle;
wherein the vehicle-assist system is to:
  detect a hazard, and determine a hazard location of the hazard, in the environment of the vehicle; and
  based on the hazard location and the gaze characteristic of the driver, output an indication of the hazard to the driver.

According to a second aspect of the present disclosure, there is provided a method of assisting a driver of a vehicle, the method comprising:
  obtaining a gaze characteristic of the driver, determined by tracking at least one eye of the driver with an eye-tracking system;
  obtaining environment data determined by monitoring an environment of the vehicle using one or more sensors;
  based on the environment data, detecting a hazard, and determining a hazard location of the hazard, in the environment; and
  causing, based on the hazard location and the gaze characteristic of the driver, an indication of the hazard to the driver.

According to a third aspect of the present disclosure, there is provided a non-transitory computer readable medium having stored thereon software instructions that, when executed by a processor, cause the processor to:
  obtain a gaze characteristic of the driver, determined by tracking at least one eye of the driver with an eye-tracking system;
  obtain environment data determined by monitoring an environment of the vehicle using one or more sensors;
  based on the environment data, detect a hazard, and determine a hazard location of the hazard, in the environment; and
  output, based on the hazard location and the gaze characteristic of the driver, an indication of the hazard to the driver.

Further features, and advantages, will become apparent from the following description of preferred embodiments of the invention, given by way of example only, which is made with reference to the accompanying drawings.

DETAILED DESCRIPTION

Details of systems and methods according to examples will become apparent from the following description, with reference to the Figures. In this description, for the purpose of explanation, numerous specific details of certain examples are set forth. Reference in the specification to "an example" or similar language means that a particular feature, structure, or characteristic described in connection with the example is included in at least that one example, but not necessarily in other examples. It should further be noted that certain examples are described schematically with certain features omitted and/or necessarily simplified for ease of explanation and understanding of the concepts underlying the examples.

The various examples described herein relate to a vehicle-assist system, sometimes referred to as an "advanced driver-assistance system" (ADAS), which assists a driver of a vehicle in carrying out driving and parking functions, for example.

The human eye has a small high-resolution fovea region and low-resolution peripheral region. The eye fixates on a specific area to analyze the scene and then performs visual searching (saccades). While driving, the driver may focus, e.g. fixate, on a small region of his entire visual field. A passenger, while not driving, may focus on a wider area than the driver. Furthermore, a more experienced driver may focus with a wider field of view, e.g. have a larger angular area of focus, than a less experienced driver.

Modern vehicles can have one or more sensors situated around them, e.g. for collision-assist or parking-assist functions. The vehicle-assist system according to present examples also includes an eye-tracking system, or simply an "eye-tracker", e.g. to determine where the driver is looking at a given time. The vehicle-assist system detects potential hazards in the environment by analyzing the camera feeds using computer vision, for example. This may be done in front of and/or behind the vehicle (e.g. when the vehicle is reversing). If a potential hazard is detected, the vehicle-assist system may determine whether the driver has detected the hazard, e.g. with a given confidence level, by analyzing eye movement of the driver, for example whether the driver's eye has fixated on the hazard (and is thus aware of the hazard) or if the hazard is particularly visible (e.g. a pothole under poor lighting conditions) in the field of view.

The vehicle-assist system can then alert the driver to the hazard, e.g. by providing directional hazard warning. For example, the vehicle-assist system may cause playing an audio alert representative of a direction of where the hazard is located; or cause displaying a hazard location on a head-up display (HUD) incorporating the vehicle windscreen, e.g. by highlighting the hazard on the windscreen. Other sensory feedback, e.g. vibrating a steering apparatus, may alert the driver that there is a hazard and to be aware of a directional hazard indicator.

Figure 1:
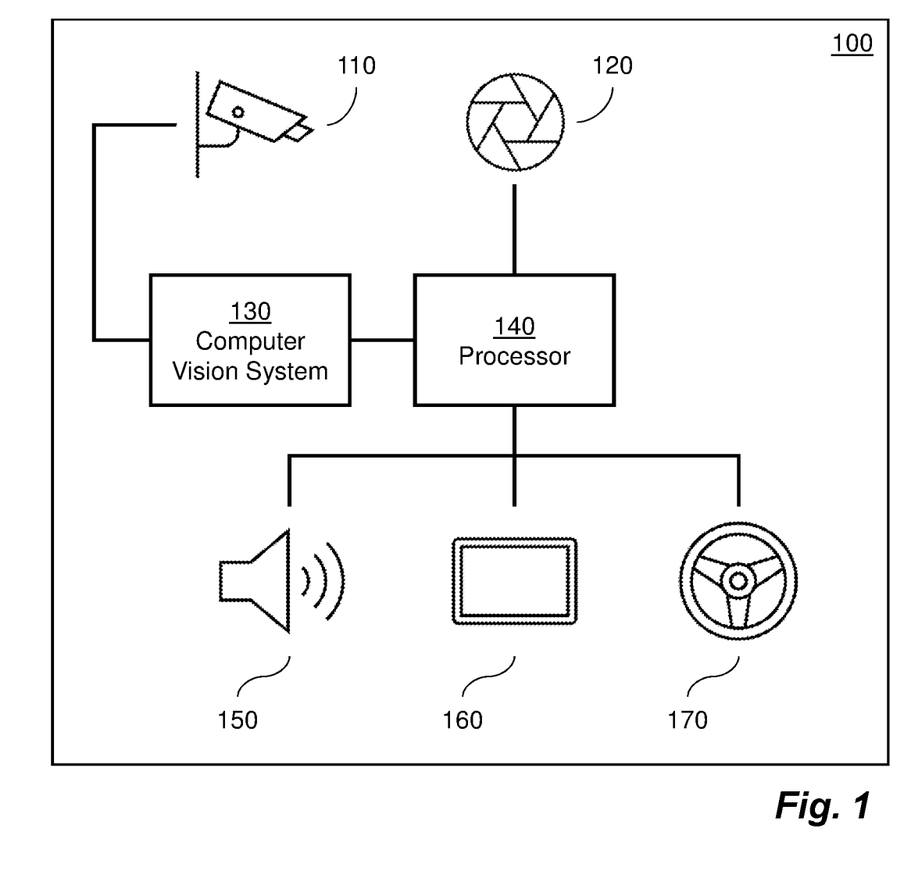
FIG. 1 is a schematic diagram illustrating a system for assisting a vehicle driver, according to examples.

FIG. 1 shows an example vehicle-assist system 100 in accordance with the present disclosure. The vehicle-assist system 100 includes one or more sensors 110 to monitor an environment surrounding a vehicle. For example, the one or sensors 110 may include one or more cameras, microphones, proximity sensors, depth sensors (e.g. Light Detection and Ranging, "LiDAR", sensors, or Radar sensors), heat (or infrared) sensors, or combinations thereof. In an example, shown in FIGS. 2A-2B, a camera 210 captures a visual representation of the environment surrounding the vehicle, e.g. as image data.

Figure 2A:
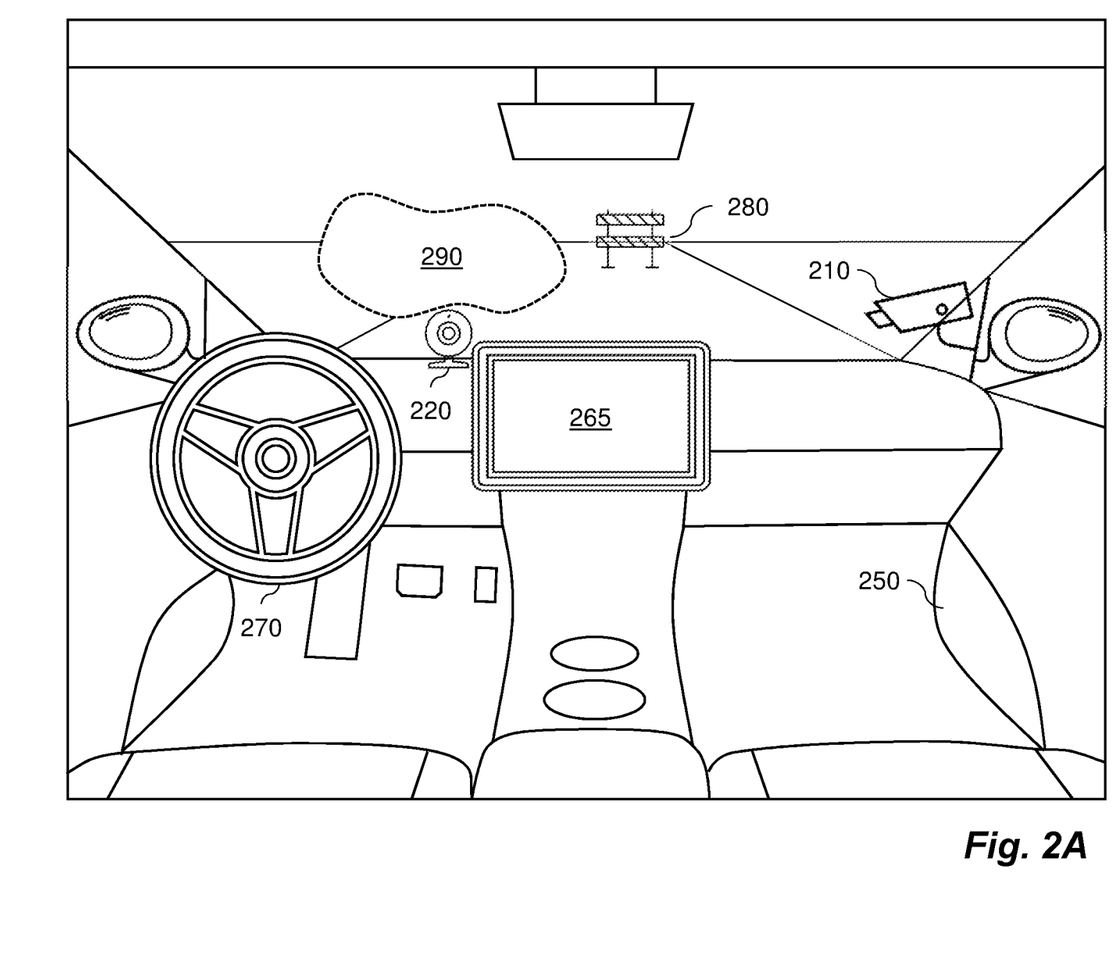
FIGS. 2A and 2B are schematic illustrations of a driver's view from an interior of a vehicle implementing the vehicle-assist system according to examples.
Figure 2B:
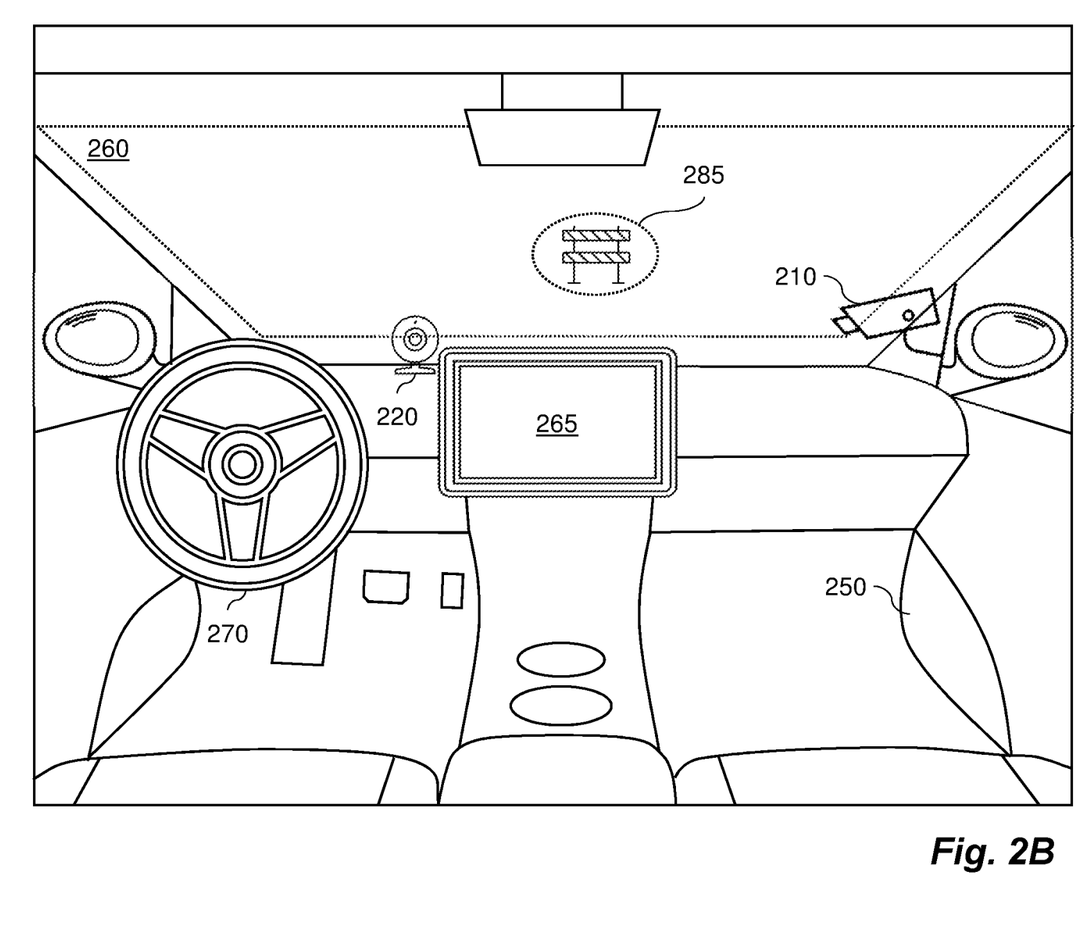

The vehicle-assist system 100 also includes an eye-tracking system 120, including an eye-tracking sensor 220, to determine a gaze characteristic of a driver of the vehicle. In examples, the gaze characteristic includes at least one of: a gaze direction of the driver at a given time, a gaze angular area covered by the driver during a given time period, or a fixation characteristic of the driver.

The vehicle-assist system 100 is configured to, e.g. via a computer vision system 130, detect a hazard and determine its location in the environment of the vehicle. In an example, the computer vision system 130 obtains on one or more images of the environment captured by the one or more cameras 110, 210 monitoring the vehicle environment and detects the hazard and determines its location in the environment based on the one or more images. In some cases, the computer vision system 130 performs object recognition to detect potential hazards, e.g. objects belonging to a predetermined category of objects predefined as potential hazards.

The hazard location may be determined in a viewer-centric coordinate system, e.g. with the driver at the origin. For example, the hazard location may be an angular location from the driver's point-of-view (POV). The hazard object subtends a solid angle, or angular area, in the viewer-centric coordinate system (or "eye coordinates") for example. In other examples, the hazard location is determined in a global coordinate system (or "world coordinates") with the driver at another location in the global coordinate system. In further examples, the hazard location is determined in a sensor-centric coordinate system, e.g. with a sensor such as a camera at the origin. For example, the sensor-captured environment data, e.g. image data, is a representation of the environment surrounding the vehicle from the POV of the sensor. The hazard location may be mapped, e.g. by a viewing transformation, between different coordinate systems for analyzing with the gaze characteristic.

Based on the determined hazard location and the gaze characteristic of the driver, e.g. as processed at a processor 140, the vehicle-assist system 100 is to output an indication of the hazard to the driver. In examples, the indication to the driver includes a directional visual, audio, haptic, and/or somatosensory alert representative of the hazard location in the environment. For example, the directional visual alert is displayed on an electronic display 160, e.g. located in or on the vehicle, such as an HUD (or "auto-HUD" when applied to an automotive vehicle). The HUD includes a transparent display that presents data in the vehicle, for example. In one type of auto-HUD, the back of the vehicle windshield, e.g. the inside surface of the windshield, is treated in such a way that an image projected onto it will reflect back to the driver's eyes. In another type of auto-HUD, a small combiner separate from the windshield is provided between the driver and the windshield, e.g. on the vehicle dashboard. The combiner may be retractable. In examples, the HUD is provided as part of a helmet wearable by the driver, e.g. of a motorcycle vehicle. The display 160 is the primary electronic display of the vehicle, e.g. normally used for other functions such as navigation, entertainment, etc., in examples—for example a display 160 located on the dashboard in a car. Such a display may be a "head down display" or HDD in examples. In other examples, the indication is made in an electronic display area used for one or more vehicle instruments, e.g. a speedometer.

In examples, a visual alert to the driver includes virtual content, e.g. displayed on the HUD, to indicate the hazard in the environment. For example, this involves rendering one or more virtual objects in the real-world environment to create a composite view for the user in which reality is enhanced by the one or more virtual objects. This may be termed "augmented reality" (AR) or "mixed reality" (MR) which references the merging of the real and virtual. AR alters a user's perception of their real-world environment, whereas "virtual reality" (VR) replaces their real-world environment with an entirely simulated (i.e. computer generated) one. In these examples, the virtual content, e.g. one or more virtual objects, may comprise visual information, for example in the form of images, which could be text or simple icons in some cases or more complex moving objects in other cases. Overlaying the visual information onto the physical environment can be done constructively (by adding to the natural environment) or destructively (by subtracting from, or masking, the natural environment). For example, the visual information, e.g. virtual objects, are overlaid onto the physical environment as perceived by the driver via the display 160, e.g. the HUD.

In other examples, a directional audio alert, representative of the hazard location in the environment, is played to the driver via a speaker 150. The speaker is located in the vehicle, a helmet or other wearable device worn by the driver such as a head mounted display device or glasses, for example. The vehicle or helmet may include an array of speakers 150, e.g. to create a directional sound system, for example. In examples, the sound alert is processed using a Head Related Transfer Function, HRTF, e.g. the driver's HRTF, to transform the sound so that it sounds as if the sound comes from a 3D location in space. For example, the sound as heard by the driver will appear to come from the location of the hazard in the surrounding environment of the vehicle. Using a HRTF in this way may involve the driver wearing headphones, e.g. integrated into a helmet or other wearable device worn by the driver such as a head mounted display device or glasses.

Additionally, or alternatively, the indication to the driver may include haptic feedback via a steering apparatus 170 of the vehicle, e.g. a steering wheel of a car or one or both handlebars of a motorcycle or bicycle. In examples, the haptic feedback is directional, e.g. the 360-degree surroundings of the vehicle are mapped onto the 360 degrees of a steering wheel in the vehicle. In other examples, the haptic or other somatosensory feedback, e.g. vibrating of the steering apparatus 170, is to alert the driver that there is a hazard and to be aware of a directional hazard indicator. For example, the haptic feedback may alert the driver to check the display 160 for a directional indication of the hazard in the environment.

In examples, the eye tracking sensor 220 of the eye tracking system 120 comprises an optical eye tracking sensor which is able to track the motion of one or more eyes of the driver by detecting light reflected from the eye of the driver with a video camera or other optical sensor. Eye tracking sensors 220 may indicate current eye positional characteristics, and/or information as to whether the driver is aware of the environment at a given time, for example the driver could have their eyes closed, e.g. while blinking, and may provide accurate eye location information. Additionally, the data output by the eye tracking sensor 220 may be used to identify or recognize a visual object that the driver is looking at in the environment of the vehicle.

Alternatively, or additionally, the eye tracking sensor 220 may comprise an electrical potential eye tracking sensor which utilizes electrical potentials measured within one or more electrodes placed around an eye of the driver. For example, the eye tracking sensor 220 may utilize electroencephalography (EEG), electromyography (EMG), or electrooculography (EOG) signal detection to track motion of the eye of the driver. Electrical potential eye tracking sensors may provide an indication of movement before movement actually begins, and hence can provide low latency.

In examples, sensor data from the eye-tracking sensor 220 is processed to determine a speed of motion of an eye of the driver. Where an object is sufficiently large that not all of the object falls within the foveal region of an eye of the driver, the driver must constantly shift the position of the eye to bring different portions of the object into the foveal region of the eye. The movements of the eye in this manner are known as saccadic eye movements (or "saccades"). Typically, several saccades are made each second, and no useful visual information can be taken in whilst saccadic motion occurs. In examples herein, the sensor data is processed to determine saccadic motion of an eye of the driver. For example, it is determined that the driver is not aware of the regions he is looking at during a saccade of his eye(s).

In examples herein, the sensor data may be processed to determine if an object in the field of view, e.g. a potential hazard, is a subject of focus of the driver. For example, a trigger to output the indication of the hazard to the driver comprises a determination that the potential hazard is not a subject of focus of the driver. In human vision, the eyes typically scan around the outline of a given object. Therefore, if the driver is looking at an edge of an object, then it may be determined based on the eye-tracking sensor data that the object itself is a subject of focus for the driver.

In examples, the eye-tracking sensor 220 determines a depth that a user is focused on through analyzing vergence movements of the eyes of the driver. For example, where the driver's focus depth and the depth of a potential hazard in the environment of the vehicle are significantly different, it can be determined that the potential hazard is not a subject of focus of the driver.

In some examples, vergence movements of the eyes of the driver are used to determine whether or not a potential hazard in the environment is a subject of focus of the driver. For example, vergence movements may indicate that a driver is focusing on a given object in the environment, with the given object being determined to be in focus once vergence movements have stopped and the eyes of the driver have been at a substantially fixed location for a pre-determined time period. In examples, sensed data from the eye-tracking sensor 220 is processed to determine when vergence movements have stopped and the eyes of the driver are at a fixed location, e.g. focusing on a particular object in the environment. In some cases, a time is determined for how long the eyes the driver have been at the fixed location, and a comparison of the determined time to a threshold is made. Fixation of an eye of the driver may be determined where the eye(s) of the driver is fixed at a particular location for a time period exceeding a pre-determined threshold.

In the examples described above, processing of the sensor/sensed data from the eye-tracking sensor 220 may be done on at least one of a processor of the eye-tracking system 120 or a processor 140 of the broader vehicle-assist system 100. The eye-tracking system 110, which may include at least part of the processor 140 of the vehicle-assist system 100, determines a gaze characteristic of the driver. For example, the gaze characteristic may be determined in accordance with the examples above relating to the processing of the sensor/sensed data from the eye-tracking sensor 220.

In examples, the gaze characteristic comprises a gaze direction of the driver at a given time. For example, the eye-tracking system determines the gaze direction, at the given point in time, based on sensor data from the eye-tracking sensor. The gaze direction may be defined in different coordinate systems, as described for the hazard location determined based on captured environment data. For example, the gaze direction may correspond to an angular displacement in the eye coordinate system. The gaze direction in the eye coordinate system may be transformed to a vector in the world coordinate system, for example. In examples, the gaze direction is projected onto a captured image of the environment, e.g. based on such a transformation.

In some cases, the gaze characteristic comprises a fixation characteristic for the driver. For example, a determination is made that the eye(s) of the driver is (are) at a fixed location, e.g. focusing on an object in the environment. As described, fixation may be determined where the eye(s) of the driver is (are) fixed at a particular location for a time period exceeding a pre-determined threshold. Fixation may correspond to vergence movements of the eye(s) of the driver having stopped. The gaze characteristic may comprise an awareness characteristic of the driver. For example, a determination of how generally aware the driver is of their surroundings may be made, e.g. based on a rate of blinking and/or saccadic patterns of the eye(s) of the driver.

Additionally, or alternatively, the gaze characteristic includes a gaze area 290, e.g. angular gaze area in the eye coordinate, covered during a given time period. For example, the gaze area may be built up from multiple gaze directions over the given time period. As for the gaze direction, the gaze area may be defined in, and transformed between, different coordinate systems. In examples, the angular gaze area may be projected onto a captured image of the surrounding environment from the one or more cameras. In such cases, for example, the angular gaze area is transformed to a gaze image area, e.g. an area of the captured image corresponding to the angular gaze area of the driver. In some cases, the gaze area 290 comprises a heat map, e.g. a static representation usable for the agglomerated analysis of visual exploration patterns of the driver. In such a heat map representation, 'hot' zones or zones with higher density designate where the driver is focusing their gaze with a higher frequency. In some cases, the gaze area 290 comprises a focus map. Such a focus map representation is a simplified version of a heat map, comprising areas in the visual field where the driver is focusing their gaze but without a 'heat' or density parameter. Akin to the focus map is a blind spot map, where zones visually less attended by the driver are displayed clearly, thus allowing for an interpretation of which zones in the visual field were not seen by the driver. The gaze area, e.g. heat map and/or focus map, may be continually updated, e.g. in real-time. For example, as the gaze direction of the driver changes with time, the gaze area 290 is built up over a given period and updated over subsequent time periods.

In examples, the vehicle-assist system 100 is to output the indication of the hazard based on a probability characteristic representative of a probability that the driver has perceived the hazard. For example, the probability characteristic is determined based on the hazard location and the gaze characteristic. In some cases, this determination is done using a machine learning model trained with a dataset of hazard locations and gaze characteristics for one or more hazard types. For example, the dataset includes a training set of images that include hazards, belonging to the one or more hazard types, in an environment. The dataset may also include gaze characteristics for a given driver during a time period where a given hazard belonging to the one or more hazard types occurred. In certain cases, the dataset also includes perception data, e.g. representative of whether the a given driver did perceive a given hazard separate to the gaze characteristic data, depending on the machine learning model used (e.g. supervised versus unsupervised learning). The machine learning model is therefore trained to determine the likelihood that a driver will perceive a potential hazard, e.g. belonging to the one or more hazard types presented to the model in training, in a new real-time situation.

The machine learning process may implement a machine learning model that includes, but is not limited to, one or more of: an artificial neural network (ANN; described above), a support vector machine (SVM), a relevance vector machine (RVM), k-nearest neighbors (k-NN), a decision tree, or a Bayesian network. The machine learning process may be based on a machine learning algorithm that includes, but is not limited to, one or more of: supervised learning, unsupervised learning, semi-supervised learning, reinforcement learning, self-learning, or feature learning.

An artificial neural network typically includes several interconnected nodes, which may be referred to as artificial neurons, or neurons. The internal state of a neuron (sometimes referred to as an "activation" of the neuron) typically depends on an input received by the neuron. The output of the neuron may then depend on the input, a weight, a bias and an activation function. The output of some neurons is connected to the input of other neurons, forming a directed, weighted graph in which vertices (corresponding to neurons) or edges (corresponding to connections) of the graph are associated with weights, respectively. The weights may be adjusted throughout training of the ANN for a particular purpose, altering the output of individual neurons and hence of the ANN as a whole.

The neurons may be arranged in layers such that information may flow from a given neuron in one layer to one or more neurons in a successive layer of the neural network. A convolutional neural network (CNN) typically includes an input layer, a plurality of convolutional layers, at least one fully connected layer and an output layer. The input layer may correspond with an input to the neural network, e.g. input image data. The convolutional layers typically extract particular features from the input data to create feature maps. The fully connected layer(s) can then use the feature maps for classification. A fully connected layer typically connects every neuron in one layer to every neuron in another layer. Fully connected layers may therefore be used to identify overall characteristics of an input, such as whether an object of a particular class, or a particular instance belonging to the particular class, is present in an input (e.g. image, video, sound) as part of an object classification process.

An ANN may be trained to perform object detection, classification, image segmentation, sound/speech recognition, etc. by processing sensor-originated data, for example to determine whether an object of a predetermined class of objects is present in the real-world environment represented by the sensor-originated data. Training the ANN in this way may generate one or more kernels associated with at least some of the layers (such as layers of the ANN other than the input and output layers). Hence, the output of the training may be a plurality of kernels associated with a predetermined ANN architecture (for example with different kernels being associated with different respective layers of a multi-layer ANN architecture). The kernel data associated with a given layer may be considered to correspond to weight data representative of weights to be applied to data input to the given layer, e.g. image data, as each element of a kernel may be considered to correspond to a weight, respectively. In the case of image data, each of these weights may be multiplied by a corresponding pixel value of an image patch, to convolve the kernel with the image patch. Other layers of the ANN (e.g. a convolutional layer in a CNN) may process a feature map as input and the respective kernels associated with the layers may be convolved with such input feature maps (IFMs). One or more layers of the ANN may alternatively process probability values as input, e.g. probabilities output by a fully connected layer, such that the weights of a kernel associated with such a layer may be multiplied by the input probability values.

The kernels may allow features of the input to be identified. For example, in the case of image data, some of the kernels may be used to identify edges in the image represented by the image data and others may be used to identify horizontal or vertical features in the image (although this is not limiting: other kernels are possible). The precise features that the kernels are trained to identify may depend on the image characteristics, such as the class of objects, that the neural network is trained to detect. The kernels may be of any size. A kernel may sometimes be referred to as a "filter kernel" or a "filter". A convolution operation, performed during processing done by a CNN, generally involves a multiplication operation and an addition operation—sometimes referred to as a multiply-accumulate (or "MAC") operation. Thus, a neural network accelerator configured to implement an ANN may include a multiplier-accumulator (MAC) unit configured to perform these operations.

After the training phase, the artificial neural network (which may be referred to as a trained neural network) can be used to detect the presence of objects of a predetermined class of objects, e.g. in input images. This process may be referred to as "classification", as described with reference to object classification, or "inference". A classification process typically involves convolution of the kernels obtained during the training phase with portions of the sensor-originated input, e.g. image patches of an image input to the ANN, to generate a feature map. The feature map may then be processed using at least one fully connected layer, e.g. to classify the object; although other types of processing may be performed.

In examples, the vehicle-assist system is to output the indication of the hazard based on a visibility characteristic representative of a visibility of the hazard to the driver. For example, the visibility characteristic includes at least one of: a weather condition in the environment, a lighting condition in the environment, an eyeglass prescription of the driver, or an object visibility characteristic of the hazard. In examples, when the lighting condition corresponds to a low-lit environment, e.g. at nighttime, a threshold for determining that the driver has perceived a potential hazard based on the gaze characteristic of the driver may be lower than when the lighting condition corresponds to more well-lit environment, e.g. in the daytime. Thus, the indication of the hazard to the driver may occur more readily, e.g. more frequently, in situations where the lighting condition is worse, e.g. at night. Similarly, where the weather condition corresponds to poorer visibility, e.g. mist or fog, the threshold for determining that the driver has perceived a potential hazard based on the gaze characteristic of the driver may be lower than when the weather condition corresponds to better visibility, e.g. light cloud with no rain. The eyeglass prescription of the driver may be another factor in determining the threshold for inferring that the driver has perceived a potential hazard based on the gaze characteristic of the driver. For example, indications for potential hazards further in the distance may be more readily output for a driver who is short-sighted than for another driver who is long-sighted. The vehicle-assist system may adapt to the driver over time, e.g. by using machine learning and adding to the training dataset with real-time data built up over time. The vehicle-assist system may thus tune its performance, e.g. beyond a baseline level implemented based on a standard training set, to a particular driver. The tuning may be reinforced by driver actions in response to the hazard indications, for example whether the driver took corrective action, e.g. via the steering apparatus 270, based on a given indication 285 of a given hazard 280, e.g. displayed on the HUD 260, during a journey. The object visibility characteristic of the hazard may be a property of the class of hazards that the hazard belongs to. For example, a hazard belonging to a 'pothole' class of hazards may have an object visibility characteristic indicating a poorer visibility than another hazard belonging to e.g. an 'ambulance' class of hazards. The dark pothole against a tarmac road is more difficult for the driver to see than a brightly colored ambulance in the scene, for example.

In some cases, a timing of the hazard indication is determined, e.g. when the hazard indication is to be output to the driver. In examples, the timing is dependent on at least one of a vehicle characteristic (e.g. brake performance, vehicle weight), an environment characteristic (e.g. weather or lighting condition), a driver characteristic (e.g. tiredness, awareness, experience, of the driver) or a speed characteristic (e.g. how quickly the vehicle or hazard is moving).

In examples, the vehicle-assist system 100 is to modify the hazard indication 285 to the driver based on the hazard location 280 and a subsequent gaze characteristic of the driver. For example, the vehicle-assist system 100 makes a check, after outputting the hazard indication 285, as to whether the driver has perceived the hazard based on the subsequent gaze characteristic of the driver. The subsequent gaze characteristic may be an updated gaze angular area 290, for example. The initial hazard indication 285 may cause the driver to change their gaze, for example, and result in the updated gaze angular area 290. The vehicle-assist system can thus determine whether to modify the hazard indication 285 to the driver based on the hazard location 280 and the subsequent gaze characteristic of the driver. In some cases, the vehicle-assist system is to modify the indication by making the indication of the hazard more prominent to the driver. For example, where the vehicle-assist system 100 makes the check and determines that the driver is still not sufficiently aware of the hazard 280, e.g. has not perceived the hazard 280 despite the initial indication 285, the indication may make the hazard indication 285 more prominent to the driver. Making the hazard indication 285 more prominent involves making the audio indication louder, the haptic feedback stronger, or the visual indication bigger, bolder, or more intrusive, for example.

In examples, the hazard indication 285 is an initial indication and the vehicle-assist system is to output a further indication of the hazard to the driver based on the hazard location and the subsequent gaze characteristic of the driver. For example, additionally or alternatively to modifying the initial hazard indication 285 when the vehicle-assist system 100 makes the check and determines that the driver is still not sufficiently aware of the hazard 280, the vehicle-assist system outputs the further hazard indication to increase the likelihood that the driver becomes aware of the hazard. In some cases, the further indication is of a different kind to the initial indication 285. For example, where the initial hazard indication 285 is output via the HUD 260, the further indication may be output via the speaker 250 or in-vehicle display 265.

In other examples, the vehicle-assist system is to stop, or reduce the prominence of, the indication of the hazard to the driver, based on the hazard location and the subsequent gaze characteristic of the driver. For example, when the vehicle-assist system 100 makes the check and determines that the driver is now sufficiently aware of the hazard 280, the vehicle-assist system stops outputting, or reduces the prominence of, the hazard indication. Since the driver has become aware of the hazard 280, the indication has served its purpose and can be stopped, for example.

Figure 3:
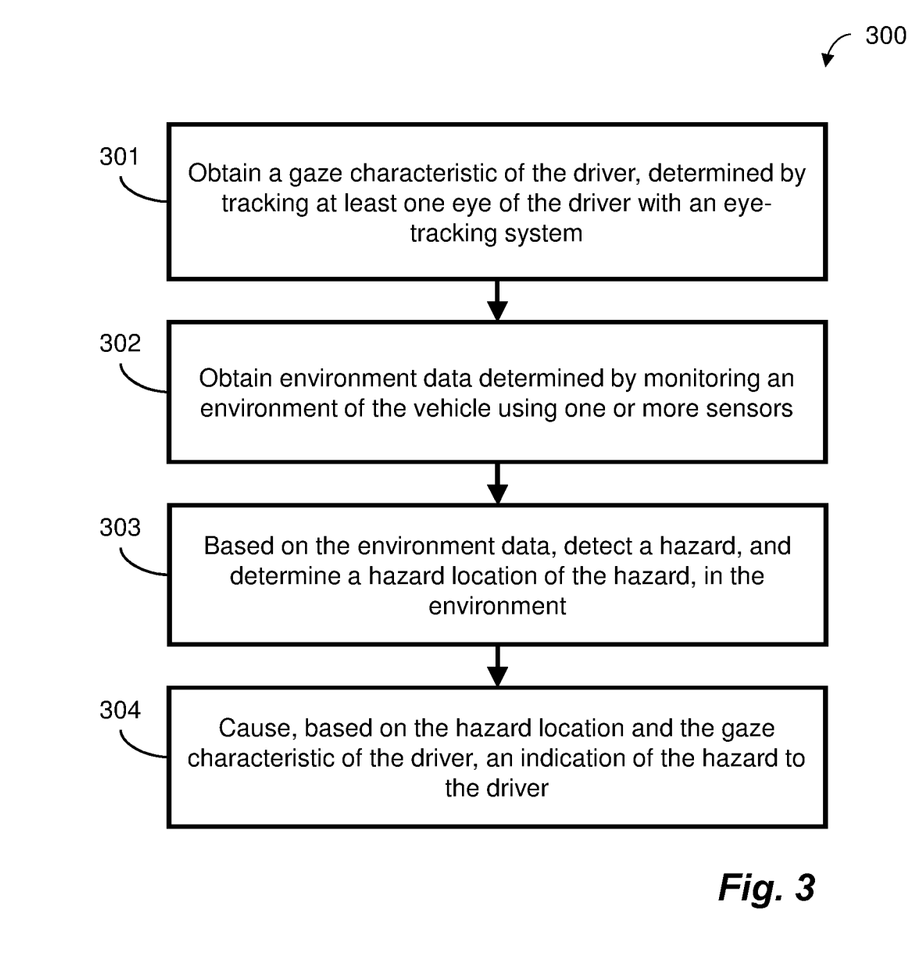
FIG. 3 shows a flow diagram illustrating a method of assisting a driver of a vehicle according to examples.

FIG. 3 shows an example method 300 of assisting a driver of a vehicle. The method 300 may be implemented using the vehicle-assist system described with reference to the examples shown in FIGS. 1, 2A-2B, for example.

In an example, at least one portion of the method 300 is implemented by executable code, stored on a non-transitory storage medium, that includes instructions that, when executed by at least one processor, cause the at least one processor to perform the at least one portion of the method 300 described herein.

In another case, at least one portion of the method 300 is implemented by at least one application-specific integrated circuit (ASIC). The ASIC may be standard or at least partially customized. In one example, the ASIC may have a structured design. The ASIC may comprise at least one microprocessor and/or at least one memory block. In another example, the ASIC comprises at least one gate array such as a field-programmable gate array. The field-programmable gate array may comprise an array of programmable logic blocks and a hierarchy of reconfigurable interconnects. The array of programmable logic blocks may, in some examples, comprise memory elements such as flip-flops. The computer readable instructions may be retrieved from a machine-readable media, e.g. any media that can contain, store, or maintain programs and data for use by or in connection with an instruction execution system. In this case, machine-readable media can comprise any one of many physical media such as, for example, electronic, magnetic, optical, electromagnetic, or semiconductor media. More specific examples of suitable machine-readable media include, but are not limited to, a hard drive, volatile memory such as a random-access memory (RAM) or synchronous dynamic random-access memory (SDRAM), non-volatile memory such as a read-only memory (ROM), an erasable programmable read-only memory (EPROM), or a portable disc.

The method 300 involves, at block 301, obtaining a gaze characteristic of the driver, determined by tracking at least one eye of the driver with an eye-tracking system. As described, in examples the gaze characteristic includes at least one of: a gaze direction of the driver at a given time, a gaze angular area covered by the driver during a given time period, a fixation characteristic, or an awareness characteristic of the driver.

At block 302, the method 300 involves obtaining environment data determined by monitoring an environment of the vehicle using one or more sensors. In examples, the one or more sensors comprise one or more cameras, and the environment data comprises image data captured by the one or more cameras. The obtained image data comprises raw image data output from an image sensor, for example. The image data may comprise pixel data. The image data may be received from the one or more cameras, or image sensors, for example via a sensor interface. Image data received from the one or more cameras may be uncompressed or compressed data. Operating on raw image data enables the described methods to be performed by an ISP communicatively coupled to one or more cameras and arranged to receive signal data, either directly or indirectly, from the one or more cameras. In some examples, the received image data comprises decoded image data output from a video decoder. In some examples, the image data is received from storage. For example, the image data may comprise processed data that was stored in storage, e.g. in a framebuffer, after being generated by a processing entity such as an ISP, CPU or GPU. As such, the obtained image data may comprise processed image data or raw image data.

The one or more sensors may additionally or alternatively include one or more microphones or other audio sensors, proximity sensors, depth sensors (e.g. LiDAR, Radar), heat (or infrared) sensors, or combinations thereof. For example, the environment data includes audio data captured by the one or more microphones. For example, the environment data includes proximity data (e.g. representative of a measured distance to an object, or "target", in the environment) captured by the one or more proximity sensors.

At block 303, a hazard is detected, and its location determined, in the environment based on the environment data. For example, one or more sounds of the environment, captured by one or more microphones monitoring the vehicle environment, are obtained. The one or more sounds, i.e. environment data, are processed, e.g. using object recognition, to detect the hazard and determine its location in the environment. In other examples, computer vision methods are used to perform the object recognition on obtained image data to detect the potential hazards in the environment.

In object recognition the environment data, e.g. image data and/or audio data, is processed using an object recognition system (or "object classifier") to determine whether one or more objects belonging to a plurality of predetermined classes of objects is present in the environment. The classes of objects may correspond to types of hazard. For example, where one of the plurality of predetermined classes of objects is the class "farm animal", the object classifier may determine whether a farm animal is present in the environment. The plurality of predetermined classes of objects may correspond to a set of object definitions accessible by the object classifier. The object classifier implements machine learning methods, e.g. an artificial neural network (ANN) or a support vector machine (SVM), in examples.

At block 304, the method 300 involves causing an indication of the hazard to the driver based on the hazard location, e.g. an angular position of the hazard in the driver's field of view, and the gaze characteristic of the driver. The hazard object subtends a solid angle, or angular area, in the viewer-centric coordinate system, for example. In examples, as described with reference to examples of the vehicle-assist system, the gaze characteristic includes at least one of: a gaze direction at a given time, a gaze area during a given time period, or a fixation characteristic. For example, the location of the hazard in the environment can be interpreted alongside the gaze characteristic, e.g. where the driver is looking, to determine whether to output the indication to alert the driver of the hazard. As an example, the gaze characteristic comprises a focus area representative of an area (e.g. mapped or projected onto the environment) that the driver is focusing on (e.g. based on data from the eye-tracker collected in real-time). If the hazard location in the environment is outside of this focus area, for example, then it is interpreted that the driver is not aware of the hazard and the indication is made to alert the driver to the hazard. In examples, an angular displacement between the gaze characteristic, e.g. gaze direction or gaze solid angle, and the hazard location is determined. For example, the hazard location may be definable, e.g. by transformation, in the (viewer-centric) eye coordinate system. The hazard location is an angular location in the eye coordinate system, for example. The hazard location may correspond with a hazard solid angle, e.g. angular area, subtended by the hazard object in the eye coordinate system. In examples, the determined angular displacement between the gaze characteristic and the hazard location has a predetermined relationship with, e.g. is above, a predetermined threshold, the hazard indication is output.

The indication may be directional to alert the driver to the location of the hazard in addition to the general presence of the hazard in the environment, e.g. involving a directional visual and/or audio alert. For example, the directional indication may be representable in, e.g. transformable to, the viewer-centric coordinate system such that a direction of the indication corresponds to the direction of the hazard, e.g. at the angular hazard location, relative to the driver located at the origin.

In examples, the method of assisting the driver of the vehicle includes causing the indication of the hazard based on a probability that the driver has perceived the hazard. For example, the method involves determining the probability, using a machine learning model, based on the hazard location and the gaze characteristic, wherein the machine learning model is trained with a dataset of hazard locations and gaze characteristics for one or more hazard types.

In examples, the hazard indication is an initial indication, and the method includes causing a further indication of the hazard to the driver based on the hazard location and a subsequent gaze characteristic of the driver. For example, the subsequent gaze characteristic is an updated gaze direction, gaze angular area, e.g. focus area, or fixation characteristic. The updated gaze characteristic, e.g. updated gaze angular area, may be a result of a change in the driver's gaze. The determination as to whether to modify the hazard indication, or cause the further hazard indication, is made based on the hazard location and the subsequent gaze characteristic of the driver. For example, the determination is based on a determined angular displacement between the gaze characteristic and the hazard location, e.g. in the viewer-centric coordinate system. If the determined angular displacement is above a threshold, for example, the hazard indication is modified or a further indication is output.

Modifying the indication, for example, includes making the indication of the hazard more prominent to the driver, e g making the audio indication louder, the haptic feedback stronger, or the visual indication bigger, bolder, or otherwise generally more eye-catching. Additionally, or alternatively, to modifying the initial hazard indication 285 when the vehicle-assist system 100 makes the check and determines that the driver is still not sufficiently aware of the hazard 280, the vehicle-assist system outputs the further hazard indication to increase the likelihood that the driver becomes aware of the hazard. In some cases, the further indication is of a different kind to the initial indication 285. For example, where the initial hazard indication 285 is output via the HUD 260, the further indication may be output via the speaker 250 or in-vehicle display 265.

The above embodiments are to be understood as illustrative examples. Further embodiments are envisaged. Although in the embodiments described above a car is described as the main example of a vehicle, using the vehicle-assist system with other types of vehicle is envisaged. For example, the vehicle may be another type of motor vehicle (e.g. a motorcycle, electric bicycle, truck, or bus), a railed vehicle (e.g. a train or tram), a watercraft (e.g. a ship or boat), an amphibious vehicle (e.g. a hovercraft), aircraft (e.g. an airplane or helicopter), or a spacecraft. In some cases, instead of an HUD, other visual hazard indications may be output to the driver via a wearable device including a display, e.g. as part of a visor or other viewing lens. Audio hazard indications may alternatively, or in addition, be output to the driver via a wearable device, e.g. earphones or headphones. A wearable display and speaker may be combined in an element of headgear, for example a helmet with inbuilt HUD visor and earphones for directional audiovisual output. Similarly, the eye-tracking system may include a wearable device, such as eye-tracking glasses, e.g. which interacts with a base station mountable on the vehicle or on the driver's person. Such a base station may also be in-built into a vehicle's data communications system.

Further embodiments are also envisaged in which other characteristics of the driver are monitored in addition to eye-tracking. For example, the vehicle-assist system may monitor driver input, e.g. use of steering, acceleration, braking, to determine if the driver is taking appropriate action in response to the hazard indication. As described in examples, the indication may be modified if the responsive action by the driver is not sufficient, e.g. to avoid the hazard. At least one of a head position or motion of the driver may additionally or alternatively be monitored. For example, the head position/motion may be interpreted along with the eye-tracking information, e.g. to determine a gaze characteristic. The head position/motion of the driver may also indicated whether the driver has perceived the hazard, e.g. initially and/or responsive to the indication, in examples. For example, if a driver saw a potential hazard out of the corner of their eye, he could be expected to turn his head in that direction by the vehicle-assist system if he is aware of the potential hazard. Driver awareness may also be monitored to determine a likelihood that the driver will notice a given hazard. For example, steering, speed control, gear changing, etc. may be monitored to determine whether the driver is driving the vehicle in a way that indicates that they are tired and more likely not to notice hazards.

Although in the examples described, outputting the hazard indication is based on the gaze characteristic and hazard location, in some examples motion of the hazard is determined and outputting the hazard indication is dependent on the hazard motion. For example, in addition to determining the hazard location, the vehicle-assist system determines a motion of the hazard in the environment. A determined motion of the hazard, e.g. a speed and/or direction thereof, may be used to determine a predicted motion of the hazard. The motion, e.g. predicted motion, of the hazard is compared to the motion, e.g. predicted motion, of the vehicle to determine a likelihood of collision in examples. For example, it could take some time for the driver to react to a potential hazard, so although there might not be an immediate risk of collision, analysis of the scene is used to see if there could be a risk of collision in the future. The scene analysis is done in real-time, for example. If the determined likelihood of collision reaches a predetermined threshold, the hazard indication is output or modified, for example. As an example, if the driver of a car continues to reverse to the right, and a nearby pedestrian is walking in that direction then the vehicle-assist system determines, e.g. based on predicted motions of the car and pedestrian, that the risk of collision is high enough to warrant outputting an indication to the driver warning of the pedestrian and their location in the environment. Additionally, or alternatively, to the predicted motions of the hazard and the vehicle, the risk of collision may be determined based on the object class of the hazard, e.g. the type of hazard.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A vehicle-assist system comprising:
   one or more sensors to monitor an environment of a vehicle;
   an eye-tracking system, including an eye-tracking sensor, to determine a gaze characteristic of a driver of the vehicle, the gaze characteristic comprising a heat map representing, by location, a frequency with which the driver looks at locations within a gaze area covered during a given time period;
   a non-transitory computer-readable medium storing a machine learning model trained on a dataset of the gaze characteristic and a dataset of hazard locations and software instructions;
   wherein the vehicle-assist system comprises a processor, that when executing the software instructions, causes the vehicle assist system to:
   detect a hazard, and determine a hazard location of the hazard, in the environment of the vehicle;
   input, into the machine learning model, the hazard location and the gaze characteristic;
   determine, using the machine learning model and based on the input hazard location and the gaze characteristic, a probability characteristic representative of a probability that the driver has perceived the hazard; and
   based on the probability characteristic, output an indication of the hazard to the driver.

2. A vehicle-assist system according to claim 1, wherein the gaze characteristic further comprises at least one of:
   a gaze direction at a given time;
   a fixation characteristic; or
   an awareness characteristic.

3. A vehicle-assist system according to claim 1, wherein the vehicle-assist system is to output the indication of the hazard based on a visibility characteristic representative of a visibility of the hazard to the driver.

4. A vehicle-assist system according to claim 3, wherein the visibility characteristic comprises at least one of:

a weather condition in the environment;
a lighting condition in the environment;
an eyeglass prescription of the driver; or
an object visibility characteristic of the hazard.

5. A vehicle-assist system according to claim 1, wherein the one or more sensors include one or more cameras, and wherein the vehicle-assist system comprises a computer vision system to detect the hazard, and determine the hazard location, based on one or more images of the environment captured by the one or more cameras.

6. A vehicle-assist system according to claim 1, wherein the indication comprises at least one of:
 a directional sound alert representative of the hazard location in the environment; or
 haptic feedback via a steering apparatus of the vehicle.

7. A vehicle-assist system according to claim 6, wherein the indication comprises the directional sound alert processed using a Head Related Transfer Function, HRTF, corresponding to a head location of the driver.

8. A vehicle-assist system according to claim 1, wherein the indication comprises a visual alert on a display.

9. A vehicle-assist system according to claim 8, wherein the visual alert comprises virtual content, displayed on the display, to indicate the hazard in the environment.

10. A vehicle-assist system according to claim 1, wherein the vehicle-assist system is to stop the indication of the hazard to the driver, based on the hazard location and a subsequent gaze characteristic of the driver.

11. A vehicle-assist system according to claim 1, wherein the vehicle-assist system is to modify the indication of the hazard to the driver, based on the hazard location and a subsequent gaze characteristic of the driver.

12. A vehicle-assist system according to claim 11, wherein the vehicle-assist system is to modify the indication by making the indication of the hazard more prominent to the driver.

13. A vehicle-assist system according to claim 1, wherein the indication is an initial indication,
 wherein the vehicle-assist system is to output a further indication of the hazard to the driver based on the hazard location and a subsequent gaze characteristic of the driver.

14. A vehicle-assist system according to claim 13, wherein the further indication is of a different kind to the initial indication.

15. A vehicle-assist system according to claim 1, wherein the vehicle-assist system is to output the indication of the hazard based on a risk of collision between the vehicle and the hazard, wherein the risk of collision is determined based on at least one of:
 an object class of the hazard;
 a predicted motion of the hazard; or
 a predicted motion of the vehicle.

16. A method of assisting a driver of a vehicle, the method comprising:
 obtaining a gaze characteristic of the driver, determined by tracking at least one eye of the driver with an eye-tracking system, wherein the gaze characteristic comprises a heat map representing, by location, a frequency with which the driver looks at locations within a gaze area covered during a given time period;
 obtaining environment data determined by monitoring an environment of the vehicle using one or more sensors;
 based on the environment data, detecting a hazard, and determining a hazard location of the hazard, in the environment;
 inputting, into a machine learning model, the hazard location and the gaze characteristic;
 determining, using the machine learning model that has been trained on a dataset of gaze characteristics and a dataset of hazard locations, and based on the input hazard location and the gaze characteristic, a probability characteristic representative of a probability that the driver has perceived the hazard; and
 based on the probability characteristic, outputting an indication of the hazard to the driver.

17. A method according to claim 16, comprising causing the indication of the hazard to the driver at a time determined based on at least one of:
 a vehicle characteristic;
 a speed characteristic;
 an environment characteristic; or
 a driver characteristic.

18. A non-transitory computer readable medium having stored thereon software instructions that, when executed by a processor, cause the processor to:
 obtain a gaze characteristic of the driver, determined by tracking at least one eye of the driver with an eye-tracking system, wherein the gaze characteristic comprises a heat map representing, by location, a frequency with which the driver looks at locations within a gaze area covered during a given time period;
 obtain environment data determined by monitoring an environment of the vehicle using one or more sensors;
 based on the environment data, detect a hazard, and determine a hazard location of the hazard, in the environment;
 input, into a machine learning model, the hazard location and the gaze characteristic;
 determine, using the machine learning model that has been trained on a dataset of gaze characteristics and a dataset of hazard locations, and based on the input hazard location and the gaze characteristic, a probability characteristic representative of a probability that the driver has perceived the hazard; and
 based on the probability characteristic, output an indication of the hazard to the driver.

* * * * *